(12) United States Patent
Parhar et al.

(10) Patent No.: US 12,492,146 B2
(45) Date of Patent: Dec. 9, 2025

(54) SOLVENT CEMENT FORMULATIONS

(71) Applicant: OATEY CO., Cleveland, OH (US)

(72) Inventors: Amrit Parhar, Westlake, OH (US); Willie J. Perez, Hudson, OH (US)

(73) Assignee: OATEY CO., Cleveland, OH (US)

( * ) Notice: Subject to any disclaimer, the term of this patent is extended or adjusted under 35 U.S.C. 154(b) by 317 days.

(21) Appl. No.: 17/029,614

(22) Filed: Sep. 23, 2020

(65) Prior Publication Data

US 2022/0089493 A1   Mar. 24, 2022

(51) Int. Cl.
*C04B 26/08* (2006.01)
*C04B 40/00* (2006.01)
C04B 111/00 (2006.01)

(52) U.S. Cl.
CPC .......... *C04B 26/08* (2013.01); *C04B 40/0039* (2013.01); *C04B 2111/00681* (2013.01); *C04B 2111/00706* (2013.01)

(58) Field of Classification Search
CPC ............... C04B 26/08; C04B 40/0039; C04B 2111/00681; C04B 2111/00706
See application file for complete search history.

(56) References Cited

U.S. PATENT DOCUMENTS

| | | | |
|---|---|---|---|
| 3,873,640 A * | 3/1975 | Owston | C08G 22/04 260/859 R |
| 5,252,634 A | 10/1993 | Patel et al. | |
| 6,087,421 A | 7/2000 | Patel et al. | |
| 6,887,926 B1 | 5/2005 | Parhar et al. | |
| 7,473,753 B2 | 1/2009 | Parhar et al. | |
| 7,592,385 B2 | 9/2009 | Bush et al. | |
| 7,838,585 B2 | 11/2010 | Parhar et al. | |
| 2006/0030689 A1 | 2/2006 | Parhar et al. | |
| 2006/0252865 A1 | 11/2006 | Bush et al. | |
| 2010/0006220 A1 | 1/2010 | Parhar et al. | |
| 2012/0043020 A1 | 2/2012 | Duff | |
| 2016/0115358 A1 | 4/2016 | Wu et al. | |
| 2019/0085220 A1 | 3/2019 | Parhar et al. | |
| 2021/0230462 A1 | 7/2021 | Parhar | |

FOREIGN PATENT DOCUMENTS

| | | | | |
|---|---|---|---|---|
| CA | 2937461 A | * | 1/2017 | ............... E06B 1/26 |
| KR | 101766593 B1 | * | 8/2016 | ............... C09J 7/30 |

OTHER PUBLICATIONS

KR101766593B1 English Translation (Year: 2016).*
ISA/220—Notification of Transmittal or Search Report and Written Opinion of the ISA, or the Declaration Mailed on Dec. 23, 2021 for WO Application No. PCT/US21/051414.

* cited by examiner

Primary Examiner — Catherine S Branch
Assistant Examiner — Huihong Qiao
(74) Attorney, Agent, or Firm — Thompson Hine LLP

(57) ABSTRACT

Provided are solvent cement formulations that include cyclopentanone, one or more additional solvents, and at least one resin. The formulations can contain a high concentration of dissolved resin, which confers beneficial properties and enables the use of the formulations for bonding large diameter piping components.

7 Claims, No Drawings

SOLVENT CEMENT FORMULATIONS

TECHNICAL FIELD

The present disclosure pertains to adhesives, such as for pipe joining applications.

BACKGROUND

Adhesives containing organic solvents have been used for many years for joining objects made from thermoplastic materials, such as PVC (polyvinyl chloride), CPVC (chlorinated polyvinyl chloride), ABS (acrylonitrile-butadiene-styrene), and other materials. In use, one or more of the present organic solvents partially dissolves or at least softens the surfaces to be joined, thereby achieving an intimate bond between these surfaces when the organic solvent evaporates. Normally, a small amount of thermoplastic resin, the same as or similar to the thermoplastic to be joined, is dissolved in the solvent, thereby producing what is referred to as a "solvent cement."

Solvent cements are conventionally used for joining PVC (polyvinylchloride), CPVC (chlorinated polyvinylchloride), and ABS plastic pipe and fittings. The amount of such plastic pipe used for conveying a variety of liquids is enormous. The major uses are drain, waste, vent sewer and potable water conveyance. Plastic pipe has increasingly displaced the traditional materials used for the same purpose such as copper, steel, galvanized metal, cast iron, lead and concrete asbestos pipe. Plastic pipe has become the material of choice in the home, municipal, and manufacturing industries.

The ASTM standard for PVC solvent cements is ASTM D-2564. According to this standard, such solvent cements contain a minimum of 10% PVC resin, inert fillers, and the remainder is one or more solvents from the group of tetrahydrofuran (THF), cyclohexanone (CYH), MEK, and acetone.

ASTM F-493 sets forth the requirements for CPVC solvent cements as containing a minimum of 10% CPVC resin, inert fillers, and the remainder is one or more solvents including THF, CYH, MEK and/or acetone.

Modern environmental and health guidelines recommend or require that the content of volatile organic compounds (VOCs) in consumer products be minimized and, where possible, eliminated. Various approaches have been attempted in order to conform to such guidelines. For example, certain components, including partially imidized acrylic polymers, have been used in solvent cement formulations that are said to reduce the requirement for VOCs, such as THF. Despite the fact that numerous solvent cement formulations have been developed, a need exists for additional formulations that possess the characteristics, such as viscosity, certain amounts of dissolved resin, low VOC content, or the exclusion of THF, that are desirable or necessary for effective use in pipe joining applications.

SUMMARY

Provided herein are solvent cement formulations comprising cyclopentanone (CYP) and one or more additional organic solvents; and, at least one resin, wherein the at least one resin includes a polyvinyl chloride (PVC) resin, a chlorinated polyvinyl chloride (CPVC) resin, an acrylonitrile butadiene styrene (ABS) resin, or an acrylic resin.

Also disclosed are solvent cement formulations comprising cyclopentanone (CYP) and cyclohexanone (CYH); and at least one of a polyvinyl chloride (PVC) resin, a chlorinated polyvinyl chloride (CPVC) resin, an acrylonitrile butadiene styrene (ABS) resin, or an acrylic resin.

The present disclosure also pertains to solvent cement formulations comprising cyclopentanone (CYP) and one or more additional organic solvents; and at least one resin, wherein the at least one resin includes a polyvinyl chloride (PVC) resin, a chlorinated polyvinyl chloride (CPVC) resin, an acrylonitrile butadiene styrene (ABS) resin, or an acrylic resin, wherein the at least one resin is present in an amount of at least 12% by weight.

Also disclosed are methods for bonding a first plastic part to a second plastic part comprising applying a solvent cement formulation according to any one of the disclosed embodiments to at least a portion of the first plastic part; and, contacting the second plastic part to the portion of the first plastic part to which the solvent cement was applied.

The present disclosure also provides articles comprising first plastic part and a second plastic part that that is bonded to the first plastic part by a solvent cement formulation according to any one of the presently disclosed embodiments.

DETAILED DESCRIPTION OF ILLUSTRATIVE EMBODIMENTS

The present inventions may be understood more readily by reference to the following detailed description taken in connection with the accompanying examples, which form a part of this disclosure. It is to be understood that these inventions are not limited to the specific formulations, methods, articles, or parameters described and/or shown herein, and that the terminology used herein is for the purpose of describing particular embodiments by way of example only and is not intended to be limiting of the claimed inventions.

As employed above and throughout the disclosure, the following terms and abbreviations, unless otherwise indicated, shall be understood to have the following meanings.

In the present disclosure the singular forms "a," "an," and "the" include the plural reference, and reference to a particular numerical value includes at least that particular value, unless the context clearly indicates otherwise. Thus, for example, a reference to "a solvent" is a reference to one or more of such reagents and equivalents thereof known to those skilled in the art, and so forth. Furthermore, when indicating that a certain element "may be" X, Y, or Z, it is not intended by such usage to exclude in all instances other choices for the element.

Although previous work has attempted to address the need for low VOC adhesive formulations, few, if any efforts have resulted in cements that both have a reduced complement of volatiles and also meet the requirements for regular-, medium-, and heavy-duty applications. It has been traditionally understood among those of ordinary skill in the art that cyclopentanone did not represent a desirable solvent, e.g., as a partial or complete alternative to tetrahydrofuran in solvent cement formulations, because of the inability of cyclopentanone to dissolve resin in a same or similar amount as THF. This was believed to be the case especially when 12-13% or more of dissolved resin is included in the solvent cement. As a result, it was not believed that solvent cements containing cyclopentanone as at least a partial substitute for tetrahydrofuran could be used in larger diameter piping applications, because such applications require that the solvent cement contains a minimum of 12% of dissolved resin in order to confer the required physical characteristics and form a complete bond.

The present inventors have surprisingly discovered that cyclopentanone can be used as a solvent in combination with other organic solvents to produce stable solvent cement formulations that contain an increased percentage of dissolved resin, particularly compared to solvent cement formulations currently known in the market and industry. In addition, it has been discovered that cyclopentanone can be used beneficially in combination with cyclohexanone to produce stable solvent cement formulations that accommodate a desirable amount of dissolved resin while maintaining a workable viscosity. The high percentages of dissolved resin that can be used in formulations containing cyclopentanone and optionally cyclohexanone mean that the formulations can successfully be used to bind high-diameter sections of piping, e.g., up to 18" diameter. For example, the presently disclosed formulations are ideal for regular-, and medium-duty uses in the context of joining piping elements, in accordance with the requirements of ASTM D2564. The present formulations may meet or exceed the minimum viscosity and lap shear strength requirements under ASTM D2564. At the same time, these discoveries enable a reduction in or elimination of the use of tetrahydrofuran in solvent cement formulations.

These and other features of the presently disclosed subject matter are described more fully herein.

Provided are solvent cement formulations comprising cyclopentanone (CYP) and one or more additional organic solvents; and at least one resin, wherein the at least one resin includes a polyvinyl chloride (PVC) resin, a chlorinated polyvinyl chloride (CPVC) resin, an acrylonitrile butadiene styrene (ABS) resin, or an acrylic resin.

Also disclosed are solvent cement formulations comprising cyclopentanone (CYP) and cyclohexanone (CYH); and at least one of a polyvinyl chloride (PVC) resin, a chlorinated polyvinyl chloride (CPVC) resin, an acrylonitrile butadiene styrene (ABS) resin, or an acrylic resin.

The present disclosure also pertains to solvent cement formulations comprising cyclopentanone (CYP) and one or more additional organic solvents; and at least one resin, wherein the at least one resin includes a polyvinyl chloride (PVC) resin, a chlorinated polyvinyl chloride (CPVC) resin, an acrylonitrile butadiene styrene (ABS) resin, or an acrylic resin, wherein the at least one resin is present in an amount of at least 12% by weight.

The cyclopentanone may be present in the present formulations in an amount of about 5-75% by weight, based on the total weight of the formulation. For example, the cyclopentanone may be present in an amount of about 10-75, 10-65, 10-55, 10-45, 15-70, 20-65, 20-60, 25-60, 25-55, 30-45, or 30-50% by weight. In certain embodiments, the cyclopentanone is present in an amount of about 5, 6, 7, 8, 9, 10, 11, 12, 13, 14, 15, 16, 17, 18, 19, 20, 21, 22, 23, 24, 25 26, 27, 28, 29, 30, 31, 32, 33, 34, 35, 36, 37, 38, 39, 40, 41, 42, 43, 44, 45, 46, 47 48, 49, 50, 51, 52, 53, 54, 55, 56, 57, 58, 59, 60, 61, 62, 63, 64, 65, 66, 67, 68, 69, 70, 71, 72, 73, 74, or 75% by weight, based on the total weight of the formulation.

The formulations also include one or more additional organic solvents in addition to cyclopentanone. In certain embodiments, the additional solvents do not include tetrahydrofuran (THF). The one or more additional solvents may be, for example, a lower alcohol, a ketone, an aldehyde, an ester, an ether, a halogenated solvent, N-methyl pyrrolidone, dimethyl-formamide, or any combination thereof. For example, the solvent may be selected from lower (e.g., $C_{1-8}$) alcohols such as methanol, ethanol and isopropanol; ketones such as acetone, methyl ethyl ketone (MEK), methyl isobutyl ketone, isophorone, or cyclohexanone (CYH); esters such as methyl acetate, ethyl acetate, ethyl formate, ethyl propionate, and butyl acetate; ethers such as methyl cellosolve (2-methoxyethanol), and dioxane; and other liquids, such as tetrahydrofuran (THF), N-methyl pyrollidone, and dimethylformamide (DMF). In some embodiments, the one or more additional solvents include methyl ethyl ketone, acetone, cyclohexanone, methylene chloride, dimethylformamide (DMF), methyl isobutyl ketone (MIBK), 1,3 dioxane, methyl acetate, propyl acetate, N-methyl-2-pyrrolidone (NMP), propylene carbonate, tetrahydrofuran (THF), or any combination thereof. Any one of these solvents may be specifically excluded. The solvent or combination of solvents may be selected based upon the type of resin that is also included in the formulation. The solvent or combination of solvents should be capable of at least partially dissolving or softening a surface of a thermoplastic polymer or combination of polymers that is preferably the same as the resin(s) that are included in the solvent cement formulation.

In some embodiments, the formulations include cyclohexanone in addition to cyclopentanone. Cyclohexanone may be included in the formulations in an amount of about 10 to about 45% by weight, based on the total weight of the formulation. For example, cyclohexanone may be present in an amount of about 10-40, 12-40, 15-40, 20-40, 25-40, or 30-40% by weight, based on the total weight of the formulation. In some embodiments, the cyclohexanone is present in the formulations in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45% by weight, based on the total weight of the formulation.

In some embodiments, the formulations include methyl ethyl ketone (MEK) in addition to cyclopentanone. MEK may be included in the formulations in an amount of about 5 to about 15% by weight, based on the total weight of the formulation. For example, methyl ethyl ketone may be present in an amount of about 5-15, 7-15, 7-12, 7-11, 8-11, or 9-11% by weight, based on the total weight of the formulation.

In some embodiments, the formulations include acetone in addition to cyclopentanone. Acetone may be included in the formulations in an amount of about 5 to about 30% by weight, based on the total weight of the formulation. For example, acetone may be present in an amount of about 5-30, 7-30, 8-30, 10-30, 12-30, 13-30, 15-30, 17-30, 18-30, 20-30, 22-30, 24-30, 25-30, or 27-30% by weight, based on the total weight of the formulation.

Any combination of organic solvents in addition to cyclopentanone may be included in the present formulations. For example, the formulations may include cyclopentanone combined with two or more of tetrahydrofuran, cyclohexanone, methyl ethyl ketone, and acetone. In some embodiments, tetrahydrofuran is not included, but at least two of cyclohexanone, methyl ethyl ketone, and acetone are present along with cyclopentanone. In some embodiments the organic solvents include cyclopentanone and cyclohexanone, and do not include tetrahydrofuran. In certain formulations, each of cyclohexanone, methyl ethyl ketone, and acetone are included with cyclopentanone.

The formulations include at least one resin. The at least one resin may include, for example, a polyvinyl chloride (PVC) resin, a chlorinated polyvinyl chloride (CPVC) resin, an acrylonitrile butadiene styrene (ABS) resin, or an acrylic resin. As described above, the present formulations advantageously can include a high concentration of dissolved resin, compared with previous solvent cement formulations. The resin may be included in the present formulations in an amount of at least 10% by weight, based on the total weight of the formulation. For example, the formulations may include about 10-20, 11-20, 12-20, 13-20, 14-20, 11-19, 11-18, 11-17, 12-16, or 14-16% by weight of the resin, based on the total weight of the formulation. It is typically the case that a solvent cement includes a resin that is chemically similar to the thermoplastic material of which the objects to be bonded are made. Accordingly, the present formulations are especially suitable for use in bonding PVC, ABS, CPVC, or acrylic objects together.

Vinyl chloride polymers and copolymers are well known among those skilled in the art. Copolymers of vinyl chloride include, for example, copolymers of vinyl chloride with one or more copolymerizable monomers having at least one terminal $CH_2=C$ group, such as other vinyl halides and vinylidene halides; acrylic acid, esters of acrylic acid such as methyl acrylate, or ethyl acrylate; methacrylic acid; esters of methacrylic acid; nitriles, such as acrylonitrile and methacrylonitrile; acrylamides, such as methyl acrylamide; vinyl ethers, such as ethyl vinyl ether; vinyl ketones; vinyl acetate; and vinyl pyridine. Copolymers of vinyl chloride may contain up to 50%, or up to 20% of the copolymerizable monomers.

Chlorinated polyvinyl chlorides (CPVC) that may be included in the present formulations include chlorinated polyvinyl chloride (also referred to sometimes as post-chlorinated PVC) homopolymers and copolymers. CPVC resins may be prepared by chlorination of any of the polyvinyl chloride homopolymers or copolymers discussed above by procedures known among those skilled in the art. CPVC resins available commercially, are generally available as powders, and may contain from about 57% to about 75% by weight of chlorine. CPVC is often the resin of choice where its high heat deflection resistance is desirable such as in hot water piping systems. CPVC resins useful as the water-insoluble resin in the composition of the invention are available commercially from, for example, The Lubrizol Corporation under the trade designation Temprite 674X571. Chlorinate polyvinyl chlorides are available commercially from The Lubrizol Corporation under the trade names Blazemaster™, Flowguard Gold™, and Corzan™. Chlorinated polyvinyl chlorides are available from ATOFINA under the tradename Lucalor™.

The present formulations may further include a stabilizer. The stabilizer may be represented by a single component or by two or more components. Suitable stabilizers are disclosed, for example, in U.S. Pat. No. 6,887,926. The stabilizer may comprise at least one organophosphite compound, a phenolic based stabilizer compound (i.e., stabilizer compound featuring a phenol group), and at least one metal-containing carbonate salt. In an exemplary stabilizer of this type for use in the present solvent cement formulations, the organophosphate compound may be triphenyl phosphite, the phenolic based stabilizer compound may be a butylated hydroxyl toluene (BHT), and the metal-containing carbonate salt may be dihydroxyaluminum sodium carbonate. The stabilizers of U.S. Pat. No. 6,887,926 are especially suitable for use in solvent cement formulations in which the thermoplastic polymer is chlorinated, as in the case of CPVC.

Other types of stabilizing agents (e.g., for PVC, ABS, and CPVC formulations) include alkyltin compounds, such as octyl tin maleate, methyltin, butyltin and octyltin; dialkyltin dicarboxylates; methyltin mercaptides and butyltin mercaptides; dialkyltin bis(alkylmercaptocarboxylate) including di-n-octyltin-S,S'-bis(isooctyl mercaptoacetate); and butylthiostannoic acid. Di-lower alkyl tin stabilizers such as C4 to C8 alkyltin mercaptides are typically preferred. The stabilizers, when present, may be included in amounts of from about 0.05 to 3% by weight. Triphenyl phosphite, BHT (butylated hydroxy toluene), complex calcium and zinc soaps of alkyl carboxylic acids and hydrotalcite can also be used.

In some embodiments, the stabilizer includes butylated hydroxytoluene, dihydroxyaluminum sodium carbonate, and a calcium-zinc- or tin-based stabilizer. In certain other embodiments, the stabilizer includes triphenyl phosphite, dihydroxyaluminum sodium carbonate, and butylated hydroxytoluene.

A stabilizer may be included in the formulations in an amount of about 0.25-5% by weight, based on the total weight of the formulation. For example, the stabilizer may be included in an amount of about 0.25-4, 0.25-3, 0.5-2, 0.75-2, or 1-2% by weight, based on the total weight of the formulation. In some embodiments, the stabilizer is present in an amount of about 0.25, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3 2.4, 2.5, 2.6, 2.7, 2.8, 2.9, or 3% by weight, based on the total weight of the formulation.

In certain embodiments, the formulations include cyclopentanone in an amount of about 10-75% by weight, cyclohexanone in an amount of about 10-40% by weight, and at least 12% by weight of a PVC, CPVC, ABS, or acrylic resin. In some of these embodiments, the formulations do not include tetrahydrofuran.

In an exemplary embodiment, the formulations include cyclopentanone in an amount of about 10-75% by weight, cyclohexanone in an amount of about 10-40% by weight, and about 10-20% by weight of a PVC, CPVC, ABS, or acrylic resin, do not include tetrahydrofuran, and include a stabilizer in an amount of about 0.5 to 2% by weight.

In some embodiments, the formulations include cyclopentanone in an amount of about 20-60% by weight, cyclohexanone in an amount of about 10-40% by weight, and about 10-16% by weight of a PVC, CPVC, ABS, or acrylic resin, do not include tetrahydrofuran, and include a stabilizer in an amount of about 1 to 2% by weight.

In some embodiments, the formulations include cyclopentanone in an amount of about 20-60% by weight, cyclohexanone in an amount of about 10-40% by weight, one or both of acetone and methyl ethyl ketone, and about 10-20% by weight of a PVC, CPVC, ABS, or acrylic resin, do not include tetrahydrofuran, and include a stabilizer in an amount of about 1 to 2% by weight.

The inventive solvent cement formulations of the present disclosure can include other components that confer desired properties. For example, the present formulations may include silica ($SiO_2$). The amount of silica in the formulations can be about 0.5-5% by weight. For example, the formulations may include 1-4%, 1-3%, 1.5-3.5%, 2-3%, about 0.5%, about 1%, about 1.5%, about 2%, about 2.5%, about 3%, about 3.5%, about 4%, about 4.5%, or about 5% silica. The silica may be fumed silica.

The inventive formulations can contain at least one solid particulate inorganic filler. In some embodiments, one or more fillers are present in a total amount of up to or about 5% by weight. More typically, the formulations can contain about 0.1% or 0.75% by weight up to about 1.5%, 3%, or 4% by weight of the solid particulate inorganic filler. The particulate inorganic fillers are inert and are generally included in the solvent cements to improve working viscosity and structural strength, and to reduce production costs. The solid particulate inorganic fillers are preferably fine powders having an average particle size of less than about 50 microns and a density of less than about 4 g/mL. Examples include ground quartz, talc, magnesium silicate, calcium carbonate, clay, whiting, shell flour, wood flour, alumina, antimony trioxide, asbestos powder, barium sulfate, calcined clays, China clays, magnesium oxide, and mica powder.

Other optional components of the presently disclosed solvent cement formulations can include lubricants, plasticizers, colorants, pigments, thickeners (such as castor oil), emulsifiers, antioxidants, thixotropic agents, polymeric rheology additives, or processing aids. A thickener may be included in an amount of about 0.01 to about 0.4% by weight, based on the total weight of the formulation, and may include, for example, an associative thickener, such as is disclosed in U.S. Pub. No. 2019/0085220. An exemplary associative thickener that may be used in the present formulations is Solthix™ 250 (The Lubrizol Corporation, Wickliffe, OH). In certain embodiments, the solvent cement formulations do not include a partially imidized acrylic polymer.

Small amounts of pigments, colorants, or brighteners, such as titanium dioxide, carbon black, dyes, or other colorants may be added to the inventive formulations, for example, to serve as a guide for uniform mixing and to provide a method of distinguishing different adhesive compositions. The amounts of such additives are typically no more than about 2% by weight.

In some embodiments, the formulations include an antioxidant, a filler, a colorant, an emulsifier, or any combination thereof.

The viscosities of the present formulations are suitable for use in a wide range of applications. As mentioned previously, the present formulations may meet or exceed the minimum viscosity requirements under ASTM D2564. For example, a formulation according to the present disclosure may have a viscosity of about 500 to about 9000 cps, measured using a Brookfield viscometer. In preferred embodiments, the formulations of solvent cements with a workable viscosity possess a viscosity of about 1600 cps to about 4500 cps.

The present formulations also provide a lap shear strength that can exceed the minimum requirements under ASTM D2564. In some embodiments, the solvent cement formulations may have a lap shear strength of at least 250 psi after two hours curing time, at least 550 psi after 16 hours curing time, and at least 900 psi after 72 hours curing time. The formulations may have a lap shear strength of about 250 to 350 psi after two hours curing time. For example, the lap shear strength after two hours curing time may be about 250, about 260, about 270, about 280, about 290, about 300, about 310, about 320, about 330, about 340, or about 350 psi. The formulations may have a lap shear strength of about 550 to about 750 psi after 16 hours curing time. For example, the lap shear strength after 16 hours curing time may be about 550 and about 750 psi. The formulations may have a lap shear strength after 72 hours curing time of about 900 to about 1200 psi.

The present disclosure also provides methods for bonding a first plastic component to a second plastic component, the method comprising applying a solvent cement to a surface of the first plastic component, and, contacting the surface of the first plastic component to a surface of the second plastic component, the solvent cement being formed from a solvent cement formulation according to any of the embodiments described above.

The first and second plastic components are preferably formed from the same material, such as PVC, CPVC, ABS, or acrylic, and are preferably formed from the same material as the resin component in the solvent cement formulation. Any objects that the user wishes to bond can function as the first and second plastic components. For example, the first component may be a piping component that includes a male end, and the second component may be a piping component that includes female end. However, the first and second components need not be piping components.

The step of applying the solvent cement to a surface of the first plastic component may be performed using any art-accepted process. For example, the solvent cement may be applied to the surface of the first plastic component by pouring, sprinkling, dabbing, brushing, spattering, or spraying the solvent cement onto the plastic component. The volume of solvent cement that is applied to the first plastic component should be sufficient to permit bonding between the first and second plastic components, and may readily be determined by those of ordinary skill in the art, depending on the nature of the first and second components, of the type of bond to be created, and the end use of the bonded components. If required, following the initial application, the solvent cement formulation may subsequently be subjected to smoothing or spreading in order to ensure a desired texture, thickness, or evenness on the portion of the first plastic part.

If desired, the present methods may also include applying the solvent cement to a surface of the second plastic component. Preferably, the surface of the second plastic component to which the solvent cement is applied represents at least a portion of the second plastic component that is contacted with a surface of the first plastic component, such as the surface of the first plastic component to which the solvent cement has also been applied.

The present disclosure further provides plastic articles comprising a first plastic component that is bonded to a second plastic component by a solvent cement formulation according to any of the preceding embodiments. The first plastic component may be bonded to the second plastic component using any of the methods disclosed above for bonding a first plastic component to a second plastic component.

The first and second plastic components are preferably formed from the same material, such as PVC, CPVC, ABS, or acrylic, and are preferably formed from the same material as the resin component in the solvent cement formulation. Any objects that the user wishes to bond can function as the first and second plastic components. For example, the first component may be a piping component that includes a male end, and the second component may be a piping component that includes female end. When the first and second plastic components are each piping components, it can be said that the plastic article represents a section of piping. When the article is piping, the piping may have a diameter of about ½" to about 18". Accordingly, the formulations according to the present disclosure may be used to join higher diameter sections of piping to each other than conventional solvent cements.

However, the first and second components are not limited to piping components. Those of ordinary skill in the art can readily identify other articles that can be formed from first and second plastic articles, such as housings for electronics, toys, household items, apparel, fencing, flooring, gutters, siding, window frames, automotive components, medical device components, and other articles. In certain embodiments, the plastic article comprises additional plastic components in addition to the first and second components. In such instances, each of the components may be bonded to at least one of the other components by a solvent cement formulation according to any embodiment disclosed herein.

When the articles are formed from piping components, the article can withstand hydrostatic burst pressures and pass hydrostatic sustained pressure tests according to applicable standards. For example, articles according to the present disclosure can withstand a hydrostatic burst pressure of at least 400 psi following a two hour curing period at 73° F. in accordance with ASTM D2564. The articles may also be able to withstand a hydrostatic burst pressure of about 425 to about 600 psi following a two hour curing period at 73° F. in accordance with ASTM D2564. The articles may also be able to pass a hydrostatic pressure test in accordance with ASTM F493. According to this standard, the hydrostatic pressure test includes curing at 73° F. for 336 hours and curing at 180° F. for 48 hours, and testing of a ½" pipe in water at 180° F. for ability to withstand 521 psi for six mins and 364 psi for four hours.

Also provided are methods for preparing a solvent cement formulation according to the present disclosure comprising mixing a resin with cyclopentanone and one or more additional organic solvents; adding a stabilizer into the mixture of the resin and the solvents; adding any further components, such as silica; and, mixing the combination of the resin, solvents, stabilizer, and additional components for an additional period of time. According to such methods, the respective identities of the resin, the solvents, the stabilizer, and additional components may be in accordance with any embodiment disclosed above in connection with the inventive solvent cement formulations. Preferably, the additional period of time during which the combination of the resin, at solvents, stabilizer, and any additional components is mixed for an appropriate time. Mixing with respect to any of the steps of the present methods may be accomplished using standard equipment under conditions that are readily deemed suitable by those of ordinary skill in the art. For example, mixing may be accomplished using a standard laboratory mixer at an appropriate mixing speed, using a dispersion blade that is appropriate for the selected speed

EXAMPLES

The following examples are set forth so as to provide those of ordinary skill in the art with a complete disclosure and description of how the formulations, methods, and articles claimed herein may be developed and evaluated, and are intended to be purely exemplary of the invention and are not intended to limit the scope of what the inventors regard as their invention. Efforts have been made to ensure accuracy with respect to numbers (e.g., amounts), but some errors and deviations should be accounted for.

Example 1—Preparation of Solvent Cement Formulations

Solvent cement formulations (Samples A-F) were respectively formed from the components as listed in Table 1, below, in the specified amounts, which are expressed in terms of percentage by weight, based on the total weight of the formulation.

TABLE 1

| Component | Sample | | | | | |
|---|---|---|---|---|---|---|
| | A | B | C | D | E | F |
| Cyclopentanone | 0 | 45 | 60 | 30 | 22 | 45 |
| Cyclohexanone | 45 | 0 | 0 | 30 | 34 | 10 |

TABLE 1-continued

| Component | Sample | | | | | |
|---|---|---|---|---|---|---|
| | A | B | C | D | E | F |
| MEK | 10.9 | 8.7 | 11 | 0 | 11 | 0 |
| Acetone | 30.3 | 30 | 14 | 25 | 17 | 28 |
| PVC | 11.5 | 14 | 13 | 13 | 14.5 | 15 |
| Fumed Silica | 2 | 2 | 1.6 | 2 | 1.5 | 2 |
| Thickener | 0.03 | 0 | 0.03 | 0 | 0.03 | 0 |
| Stabilizer | 0 | 1 to 2 | 1 to 2 | 1 to 2 | 1 to 2 | 1 to 2 |
| Viscosity (cps) | 4000 | 9500 | 3000 | 340 | 4150 | 1300 |
| Total | 100 | 100 | 100 | 100 | 100 | 100 |

When present in a given sample, the thickener that was used was Solthix™ 250 (The Lubrizol Corporation, Wickliffe, OH), and the stabilizer that was used represented a package of multiple components.

The basic procedure for preparing the solvent cement formulations included first weighing out each solvent and pouring each into an appropriately sized mixing vessel. A laboratory mixer equipped with a High Speed 3" Diameter Dispersion Blade was activated in order to begin mixing the contents of the vessel. The remaining components, including the PVC, and any fillers, emulsifiers, stabilizers, and the like, were added to the mixing vessel. Mixing was continued for an additional period, after which time any colorant was added to the mixing vessel. Five additional minutes of mixing was performed. The mixer was stopped, and the mixed samples were each transferred into respective cans and capped tightly. The contained solvent cement formulations were allowed to cool before any testing.

Evaluation of the tested formulations revealed that formulations B-F according to the present disclosure, i.e., containing cyclopentanone, accommodated a higher percentage of dissolved resin, relative to comparative formulation A, which included 11.5% by weight of dissolved PVC. These results demonstrated that cyclopentanone can be used as a solvent to produce stable solvent cement formulations that contain a high percentage of dissolved resin, which was unexpected in view of the previous belief among those skilled in the art that cyclopentanone did not represent a viable choice, e.g., as an alternative to THF, because of the perceived tendency to raise viscosity to unworkable levels, particularly when 12-13% by weight or more of dissolved resin is included. The evaluation of the inventive formulations also demonstrated that cyclopentanone can be used beneficially in combination with cyclohexanone to produce stable solvent cement formulations that accommodate a desirable amount of dissolved resin. The high percentages of dissolved resin that formulations B-F contained highlight the ability of the formulations to bind larger diameter sections of piping, e.g., up to 18". The exemplary inventive formulations further illustrate that cyclopentanone can also be combined with other organic solvents to produce viable and workable solvent cement formulations to dissolve a minimum amount resin to be used in joining small- or medium-diameter pipes.

What is claimed:
1. A solvent cement formulation consisting of:
 a solvent package consisting of at least 30% cyclopentanone and up to about 30% acetone, based on the total weight of the formulation, and optionally one or more additional organic solvents selected from the group consisting of cyclohexanone, methyl ethyl ketone, methylene chloride, dimethylformamide, methyl isobutyl ketone, 1,3 dioxane, methyl acetate, propyl acetate, N-methyl-2-pyrrolidone, propylene carbonate, and any combination thereof;

at least one resin present in an amount of at least about 12% by weight to about 20% by weight, wherein the at least one resin includes a polyvinyl chloride resin, a chlorinated polyvinyl chloride resin, an acrylonitrile butadiene styrene resin, or an acrylic resin;

optionally, from 0.25% to 5% of a stabilizer;

optionally, from 0.5% to 5% of silica; and optionally, additives selected from the group consisting of a colorant, lubricant, plasticizer, thickener, emulsifier, antioxidant, thixotropic agent, polymeric rheology additive, processing aids, and combinations thereof;

wherein the solvent cement formulation is configured to bond components having resin-based surfaces and is capable of dissolving at least a portion of the resin-based surfaces.

2. The solvent cement formulation of claim 1 further comprising a stabilizer.

3. The solvent cement formulation of claim 1, wherein cyclopentanone is present in an amount of about 30% to about 75% by weight.

4. The solvent cement formulation of claim 1, wherein cyclopentanone is present in an amount of about 30% to about 75% by weight, and the one or more additional organic solvents comprise cyclohexanone present in an amount of about 1 to about 40% by weight.

5. The solvent cement formulation of claim 1, further comprising methyl ethyl ketone in an amount of about 5 to about 15% by weight.

6. A solvent cement formulation consisting of:

a solvent package consisting of at least 30% cyclopentanone, up to about 30% acetone, based on the total weight of the formulation, and cyclohexanone;

at least one of a polyvinyl chloride resin, a chlorinated polyvinyl chloride resin, an acrylonitrile butadiene styrene resin, or an acrylic resin, wherein the resin is present in an amount of at least about 12% by weight to about 20% by weight;

optionally, from 0.25% to 5% of a stabilizer;

optionally, from 0.5% to 5% of silica; and optionally, additives selected from the group consisting of a colorant, lubricant, plasticizer, thickener, emulsifier, antioxidant, thixotropic agent, polymeric rheology additive, processing aids, and combinations thereof;

wherein the solvent cement formulation is configured to bond components having resin-based surfaces and is capable of dissolving at least a portion of the resin-based surfaces.

7. The solvent cement formulation of claim 6, wherein cyclopentanone is present in an amount of about 30% to about 75% by weight, and the cyclohexanone is present in an amount of about 1 to about 40% by weight.

* * * * *